Aug. 14, 1923.

J. L. KLEMME 1,464,943

TRIP RECORDING COMPASS FOR AEROPLANES

Filed June 14, 1920

INVENTOR.
JOHN L. KLEMME.
BY HIS ATTORNEYS.

Patented Aug. 14, 1923.

1,464,943

UNITED STATES PATENT OFFICE.

JOHN L. KLEMME, OF ALBERT LEA, MINNESOTA.

TRIP-RECORDING COMPASS FOR AEROPLANES.

Application filed June 14, 1920. Serial No. 388,791.

*To all whom it may concern:*

Be it known that I, JOHN L. KLEMME, a citizen of the United States, residing at Albert Lea, in the county of Freeborn and State of Minnesota, have invented certain new and useful Improvements in Trip-Recording Compasses for Aeroplanes; and I do hereby declare the following to be a full, clear, and exact description of the invention, such as will enable others skilled in the art to which it appertains to make and use the same.

My invention has for its object to provide a simple and efficient trip recording compass or device for aeroplanes, and to such ends, generally stated, the invention consists of the novel devices and combinations of devices hereinafter described and defined in the claims.

This recording instrument is of such character that it requires no attention, whatever, from the aviator, and, in fact, its operation is independent of, and beyond his control, so that it will record the character of the trip accurately and with certainty, whether or not in accordance with the desire of the aviator. For instance, it will record the direction of travel, the time of travel in each and every direction, and the number and time of stops made.

The recorder comprises a pendulum or gravity-arighted member mounted for universal movements, and journaled to this pendulum on a vertical axis, and itself held always in a horizontal position, is a record supporting disk-like table that is adapted to hold a disk-like table recording sheet. This pivoted record supporting table is connected to a permanent magnet which holds the same in constant direction or position in respect to north and south.

Extended diametrically above the record supporting table, and mounted in bearings carried by the pendulum, is a screw-threaded feed rod or small shaft that is driven by a timed motor, preferably a watch movement that is also carried by the pendulum. This threaded feed shaft moves with a timed action. A stylus or marker is arranged to mark on the face of the record sheet; and this stylus is arranged to be automatically tripped out of action whenever the aeroplane lands, so as to thereby indicate stops or landings of the aeroplane.

The improved recorder is illustrated in the accompanying drawings wherein like characters indicate like parts throughout the several views.

Referring to the drawings.

Figure 1:
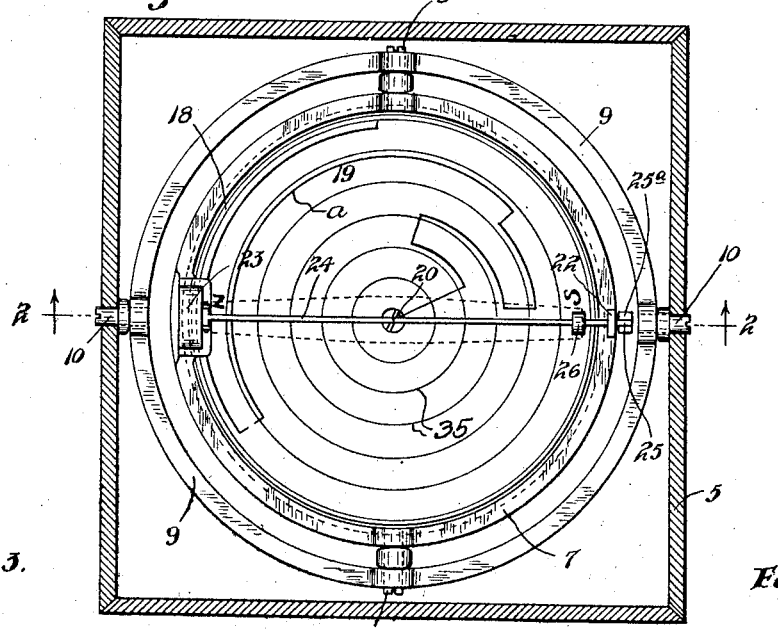
Fig. 1 is a horizontal section taken on the line 1—1 of Fig. 2.
Figure 3:
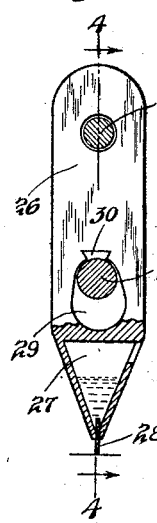
Fig. 3 is an enlarged section taken on the irregular line 3—3 of Fig. 4, and particularly illustrating the construction of the stylus.

The numeral 5 indicates a suitable casing shown as provided with a detachable top section 6, which, in practice, may be secured in position by a key-actuated lock, so that the recorder cannot be tampered with by the aviator during the trip.

The pendulum or gravity actuated member preferably employed is in the form of a bowl 7 which, at diametrically opposite points, and above its center of gravity, is pivotally connected by pivot screws or pins 8 to a surrounding ring 9. The ring 9, at diametrically opposite points, ninety degrees from the pivots 8, is pivotally connected by pivot screws or pins 10 to opposite sides of the case 5. Thus, the pendulum 7 is suspended for universal movements in such manner that its upper edge will remain horizontal, regardless of movements of the aeroplane. The top portion 6 of the casing should be high enough to permit the casing to turn completely over without upsetting the pendulum. Preferably, a liquid, such as alcohol indicated at *y* is placed in the bowl of the pendulum 7. The bowl of said pendulum is provided at its vertical center with a post 11 that rises from the bottom thereof and terminates in a needle point 12.

The numeral 13 indicates a permanent magnet shown as formed at its center with a vertically projecting trunnion 14 which, at its bottom is formed with a depression that rests on the needle point 12. The numeral 15 indicates small floats attached to the north and south poles of the magnet 13 and on the surface of the liquid *y*.

The numeral 16 indicates a disk-like plate detachably seated in the bowl of the pendulum 7, above the magnet 13. This plate 16 is provided at its center with an annular stabilizing bearing, preferably in the form of a jewel 17 that lightly engages the trunnion 14 above the needle point 12. Thus, the magnet is thus supported with very little friction.

Located above the plate 16 and secured to the frame 14 so that it will move with the permanent magnet 13, is a disk-like record supporting table 18, on the face of which a paper recording disk or wheel 19 is adapted to be detachably secured. As shown, the table 18 is detachably secured to the trunnion 14 by a small centrally located screw 20.

The screw-threaded feed shaft 21 is journaled in one end in a bracket 22 on one side of the rim of the bowl-like pendulum 7, and at its other end, is journaled in the casing 23 that is rigidly secured to the opposite side of the rim of said pendulum and encloses a watch movement that rotates the shaft 21 with a timed action.

The numeral 24 indicates a guide rod which, at one end, is pivoted to the casing 23, and at its other end, extends through a vertical perforation 22$^a$ in the bracket 22 and has a downturned end 25 that terminates in a head 25$^a$.

The numeral 26 indicates the stylus or marker which, at its lower end, is provided with an ink well 27 and a depending marking point 28, which latter is engageable directly with the record sheet 19. This stylus, at its upper end, has a perforation through which the guide rod 24 is passed, and lower down it is provided with a vertically elongated passage 29 through which the feed shaft 21 is extended. In the upper portion of the slot 29 a threaded nut segment 30 is inserted and rigidly secured, normally, for direct engagement with the threads of the feed shaft 21.

Figure 2:
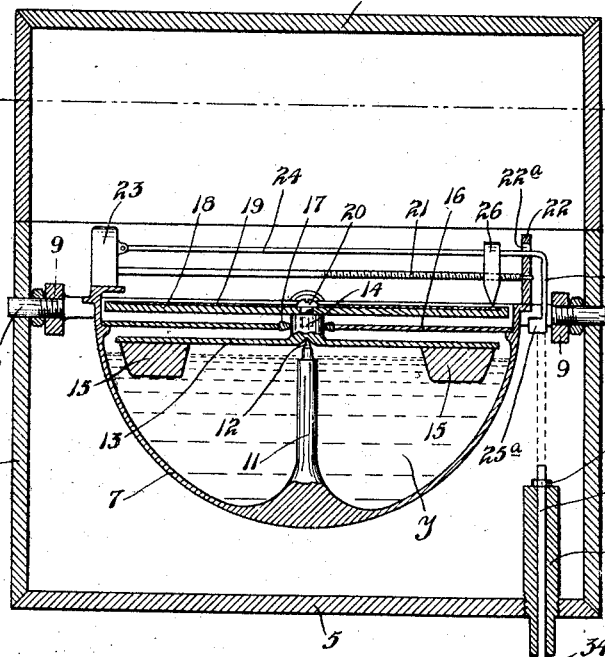
Fig. 2 is a vertical section taken on the line 2—2 of Fig. 1.
Figure 4:
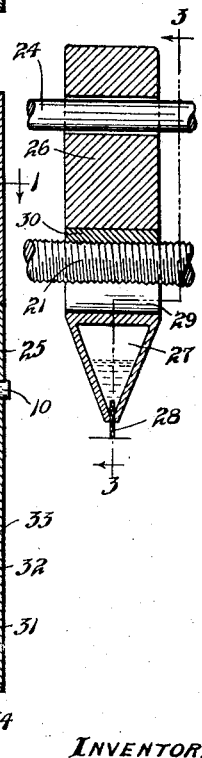
Fig. 4 is a section on the line 4—4 of Fig. 3.

Working vertically through a guide sleeve 31 in the bottom of the casing 5 is a vertically movable trip rod plunger 32, the downward movement of which is limited by a collar 33. A coiled spring 34 yieldingly presses the plunger of the trip rod 32 downward. The lower end of this rod 31 will be engaged, either directly with the ground, or with some part of the aeroplane in such manner that whenever the aeroplane lands, said rod will be forced upward, as indicated by dotted lines in Fig. 2, and into engagement with the head 25$^a$, thereby raising the guide rod 24 and lifting the nut segment 30 of the stylus 26 out of engagement with the record sheet. This will more clearly hereinafter appear.

The operation of this device is probably obvious from the foregoing description, but may be summarized, as follows:

When the aeroplane is in flight, the stylus will be in contact with the record sheet 19 and will be moved continuously radially toward the axis of the table 18. This table will, by the compass, be held in a constant position, in respect to north and south, and hence, when the machine is flying on an exact straight line, the stylus will mark a true radial line on the record sheet, but the position of this radial line, in respect to a certain mark, such as north, or a mark indicating north on the record sheet, will indicate the direction of the flight. When other than a straight line is being traveled, a curved or crooked line will be marked on the record sheet. Of course, the stylus, if driven continuously by the threaded feed shaft, will occupy predetermined positions, or different time intervals indicated by the watch movement, and hence, if there is any interruption or conflict between positions of the stylus and time indicated by the watch, then it will be clear that a stop or landing, has been made, and the total time of landing can easily be determined. Moreover, when a landing is made, as already stated, the trip rod 32 will raise the guide rod 24 and the stylus 26, thus terminating, temporarily, the line marked on the record sheet. When the machine, or aeroplane, again starts its flight, the stylus will again drop back into action, behind its scheduled time indicated by the watch, however, and if the aeroplane has been shifted to the least extent while on the ground, or has changed, to the least extent, its angular position in starting its flight, the new line will be started from a new point, thereby showing a gap that will indicate the stop or landing. The radial distance between the end of the recorded line and the beginning of the new line will indicate the time of the stop. Even if it were possible to bring the stylus back to exactly the same point, in starting a new line, there would be a dot or blot produced that would indicate the stop or landing. The concentric circles 35 on the chart designate equal intervals of movement of the stylus. The time consumed in making a certain flight, as recorded by the line on the chart can thus be quickly computed. The curve on the chart shown designated as $a$ in Fig. 1, is a resultant of the movement of the stylus by the shaft 21 and the movement of the chart relative to the rest of the device. The magnet or compass tends to hold the chart stationary and the rest of the instrument will be turned as the aeroplane or other carrier turns. The movements of the aeroplane or other member carrying the device in a straight line and the various turns made by the same are thus registered and the direction of the travel indicated. The north and south poles of the compass are also indicated by the letters N and S in Fig. 1.

This recorder will, therefore, reliably and accurately indicate and record directions of flight, time of travel in each direction, and stops or landings; and when the recorder is used in connection with a speedometer, it will afford means for readily determining distances traveled in each direction. This device is therefore, especially adapted for use in connection with aeroplanes, such as mail carrying or messenger planes which have predetermined routes, and where it is advisable, or desirable to record just what an aeroplane is doing during its trips.

What I claim is:

1. A trip recording compass comprising a pendulum supported for universal self-arighting movements, a horizontal table rotatably mounted on said pendulum, a magnetic needle connected to said table and maintaining a predetermined position thereof, in respect to north and south, a stylus movable over said table, a time-actuated feed device for said stylus, and means for throwing said stylus temporarily out of action when landing of the aeroplane has been made.

2. A trip recording compass comprising a pendulum supported for universal self-arighting movements, a horizontal table rotatably mounted on said pendulum, a magnetic needle connected to said table and maintaining a predetermined position thereof, in respect to north and south, a stylus movable over said table, a time-actuated feed device for said stylus, and means for throwing said stylus temporarily out of action when landing of the aeroplane has been made, said means comprising a depending trip rod arranged to be forced upward to accomplish said function.

3. A trip recording compass comprising a pendulum mounted for universal self-arighting movements, a horizontal record supporting table rotatably mounted on said pendulum and provided with a magnetic needle for maintaining a constant position thereof in respect to north and south, a time-actuating threaded feed shaft journaled in supports carried by said pendulum, a guide rod extended along said feed shaft but capable of movement at one end, a stylus movable on said guide rod and having a nut segment normally engageable with the threads of said feed shaft, and means for raising said guide rod and thereby moving the nut of said stylus out of engagement with the thread of said feed shaft when the machine makes a landing.

4. A trip recording compass comprising a pendulum mounted for universal self-arighting movements, a horizontal record supporting table rotatably mounted on said pendulum and provided with a magnetic needle for maintaining a constant position thereof, in respect to north and south, a time-actuating threaded feed shaft journaled in supports carried by said pendulum, a guide rod extended along said feed shaft but capable of movement at one end, a stylus movable on said guide rod and having a nut segment normally engageable with the threads of said feed shaft, and means for raising said guide rod and thereby moving the nut of said stylus out of engagement with the thread of said feed shaft when the machine makes a landing, said means comprising a normally depressed trip rod adapted to be moved upward into engagement with the movable end of said guide rod to accomplish said function.

5. In a trip recording compass, the combination with a weighted bowl comprising a central upstanding post mounted for universal self-arighted movements and containing liquid, a magnetic needle having floats riding on the liquid contained in said bowl and axially supported on said post, a disk-like record supporting table supported on said needle, and a time-actuated stylus movable over said table, the latter having supports and operating means carried by said bowl.

6. In a trip recording compass, the combination with a bowl comprising a pendulum mounted for universal self-arighted movements and containing liquid, a horizon-disk-like record supporting table journaled to said pendulum and providing the bowl of said pendulum with a magnetic needle having floats riding on the liquid contained in said bowl, a time-actuated stylus movable over said table, the latter having supports and operating means carried by said pendulum, and means for automatically throwing said stylus temporarily out of action when the machine has made a landing.

7. A trip recording compass having in combination a casing, a bowl pivotally mounted therein on a plurality of intersecting axes and having an integral weighted portion centrally therein comprising a standard, a magnetic needle mounted on said standard, a recording table carried by said needle, guiding means for said table and needle and a stylus carried by said bowl and actuated to move over said table.

8. A trip recording compass having in combination a bowl pivotally mounted on a plurality of axes comprising an integral weighted portion centrally disposed therein comprising a standard, liquid in said bowl, a magnetic needle and table carried thereby and supported for rotation on said liquid and standard, and a stylus supported and guided by means on said bowl and movable across said table.

JOHN L. KLEMME.